US006567167B1

(12) United States Patent
Chou et al.

(10) Patent No.: US 6,567,167 B1
(45) Date of Patent: May 20, 2003

(54) COMPENSATING POLARIZATION MODE DISPERSION IN FIBER OPTIC TRANSMISSION SYSTEM

(75) Inventors: Patrick C. Chou, Cambridge, MA (US); Hermann A. Haus, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/505,313

(22) Filed: Feb. 16, 2000

(51) Int. Cl.⁷ .............................. G01J 4/00; G02B 6/00
(52) U.S. Cl. ....................... 356/367; 356/365; 356/368; 356/73.1; 385/11; 385/28; 385/29; 385/123; 359/484
(58) Field of Search ............................... 359/246, 249, 359/192, 156, 153, 189, 190, 161, 483, 484, 489, 494, 497, 499; 385/11, 28, 29, 123; 356/364, 365, 367, 368, 73.1

(56) References Cited

U.S. PATENT DOCUMENTS

| | | | |
|---|---|---|---|
| 5,212,743 A | * 5/1993 | Heismann | 385/11 |
| 5,311,346 A | * 5/1994 | Haas et al. | 359/156 |
| 5,659,412 A | 8/1997 | Hakki | 359/156 |
| 5,859,939 A | * 1/1999 | Fee et al. | 385/24 |
| 5,930,414 A | * 7/1999 | Fishman et al. | 385/11 |
| 6,204,924 B1 | * 3/2001 | Cyr | 356/453 |

FOREIGN PATENT DOCUMENTS

EP  0 909 045 A2  4/1998

OTHER PUBLICATIONS

Francia C. et al., "Polarization Mode Dispersion in Single–Mode Optical Fibers: Time Impulse Response", 1999 IEEE International Conference on Communications, Conference Record, Vancouver, CA, Jun. 6–10, 1999, IEEE International Conference on Communications, New York, NY, vol. 3, pp. 1731–1735.

Hok Yong Pua et al., "An Adaptive First–Order Polarization–Mode Dispersion Compensation System Aided by Polarization Scrambling: Theory and Demonstration", Journal of Lightwave Technology, IEEE, vol. 18, No. Jun. 6, 2000, pp. 832–841.

Bulow et al., "Measurement of the Maximum Speed of PMD Fluctuation in Installed Field Fiber," Optical Fiber Communication Conference and the International conference on Integrated Optics and Optical Fiber Communications (Cat. No. 99CH36322), *IEEE*, Part vol. 2, 1999, pp. 83–85, vol. 2, Piscataway, NJ, USA.

Chbat et al., "Long Term Field Demonstration of Optical PMD Compensation on an Installed OC–192 Link," Optical Fiber Communication Conference and the International Conference on Integrated Optics and Optical Fiber Communications (Cat. No. 99CH36322), *IEEE*, Part Suppl., 1999, pp. PD/12–1–3 Suppl., Piscataway, NJ, USA.

Glingener et al., "Polarization mode dispersion compensation at 20 Gb/s with a compact distributed equalizer in LiNbO₃," Optical Fiber Communication Conference and the International Conference on Integrated Optics and Optical Fiber Communications (Cat. No. 99CH36322), *IEEE*, Part Suppl., 1999, pp. PD29/1–3 Suppl., Piscataway, NJ, USA.

Heffner, "Deterministic, Analytically Complete Measurement of Polarization–Dependent Transmission Through Optical Devices," *IEEE Photonics Technology Letters*, 4:451–454, 1992.

(List continued on next page.)

*Primary Examiner*—Evelyn Lester
(74) *Attorney, Agent, or Firm*—Fish & Richardson P.C.

(57) ABSTRACT

A real-time optical compensating apparatus reduces the PMD in an optical fiber by determining the principal states of polarization of the optical fiber and delaying one principal state of polarization with respect to the other.

12 Claims, 9 Drawing Sheets

OTHER PUBLICATIONS

Heismann et al., "Electrooptic Polarization Scramblers for Optically Amplified Long–Haul Transmission Systems," *IEEE Photonics Technology Letters*, 1994.

Heismann et al., "Automatic Compensation of First–Order Polarization Mode Dispersion in a 10Gb/s Transmission System," *ECOC*, 529–530, 1998.

Poole et al., "Polarization–dependent pulse compression and broadening due to polarization dispersion in dispersion –shifted fiber," *Optics Letters*, 13:155–157, 1988.

Poole et al., "Phenomenological Approach to Polarisation Dispersion in Long Single–Mode Fibres," *Electronics Letters*, 22:1029–1030, 1986.

* cited by examiner

COMPENSATING POLARIZATION MODE DISPERSION IN FIBER OPTIC TRANSMISSION SYSTEM

This invention was made with government support under Grant Numbers F49620-96-1-0126 and N00014-92-J-1302 awarded by the Air Force and the Department of the Navy. The government has certain rights in the invention.

This invention relates generally to fiber optics and more specifically to an apparatus for reducing the polarization mode dispersion in a fiber optic transmission system.

BACKGROUND OF THE INVENTION

Polarization mode dispersion (PMD) refers to variations in the time delay of a polarized optical signal traveling through an optical transmission system, such as a single-mode optical fiber. PMD arises in an optical fiber as a result of asymmetries in the optical fiber's core, such as core ellipticity created during optical manufacturing and bending stresses formed during installation. The asymmetries of the fiber's core cause random changes in the state of polarization (SOP) of optical signals propagating through the fiber. Different SOPs propagate through the optical fiber core at different relative speeds, e.g., some SOPs travel faster and some travel slower, resulting in a pulse width distortion of a transmitted optical signal relative to an input optical signal. Additionally, the asymmetries of the fiber's core are highly susceptible to environmental fluctuations, such as temperature or movement of the fiber, which occur as fast milliseconds and result in a time varying pulse width distortion of the transmitted optical signal.

The varying pulse width distortion is mathematically represented by a time delay between two orthogonally polarized principal states of polarization ("PSP") which form a convenient basis set to describe and characterize each SOP, and evaluate the effects of PMD in the fiber. Using the PSPs as a basis set, each SOP propagating through an optical fiber is represented by a linear combination of the two orthogonally polarized PSPs. The varying pulse width distortion of the SOP is a function of a varying delay between the PSPs. Theoretically, each PSP experiences a time of flight difference through the optical fiber, commonly known as differential group delay, resulting in a time delay between the two PSPs at the fiber output. The output SOP is represented by a linear combination of the PSPs which are time delayed with respect to each other. A greater time delay between the PSPs corresponds to a larger relative difference between the input SOP pulse width and the output SOP pulse width. See for example C. D. Poole and R. E. Wagner, "A Phenomenological Approach to Polarization Dispersion in Long Single-Mode Fibers." Electronic Letters, Vol. 22, pp. 1029–1030, September 1986, which is incorporated by reference herein.

Optical fibers have a differential group delay (DGD) between the two PSPs on the order of 0.1 ps/km. In older fiber optic cables, such as the cables used in terrestrial networks, the DGD is on the order of 2.0 ps/km and results in time delays of about 50 picoseconds for transmission distances of only several hundred kilometers. As the demand for faster optical data transmission increases, such as from gigabits per second to terabits per second, optical pulse width distortion due to PMD will become one of the factors limiting data transmission rate.

SUMMARY OF THE INVENTION

A real-time optical compensating apparatus reduces first-order PMD in an optical fiber by determining the PSPs of the optical fiber and delaying one PSP with respect to the other.

In one aspect, the invention features an optical compensating apparatus for reducing PMD in an optical signal transmitted through an optical medium. The apparatus includes a polarization controller configured to receive an optical signal propagating through the optical medium, to determine the principal states of polarization of the optical medium, and to transform the optical signal based on the principal states of polarization. The apparatus also includes a delay controller arranged in an optical path of the medium after the polarization controller and configured to receive the transformed optical signal, to generate a signal proportional to the PMD time delay, and to minimize PMD time delay of the transformed optical signal.

Embodiments of this aspect may include one or more of the following features. The polarization controller includes a polarimeter. The delay controller includes a polarimeter. The polarization controller further includes a polarization transformer arranged in the path of the optical signal after the polarimeter. The delay controller further includes a delay transformer arranged in the path of the optical signal after the polarimeter of the polarization controller and before the polarimeter of the delay controller. The polarization transformer includes a quarter-waveplate and a half-waveplate.

In another aspect, the invention features an optical compensating apparatus for reducing PMD in an optical signal transmitted through an optical medium. The apparatus includes a polarization module configured to receive an optical signal propagating through the optical medium, determine the optical properties of the optical medium, and generate a signal for transforming the polarization of the optical signal; a polarization transformer arranged in an optical path of the medium after the polarization module and configured to transform the optical signal based on the signal received from the polarization module; and a delay controller arranged in an optical path of the medium after the polarization transformer and configured to receive the transformed optical signal, to generate a signal proportional to the PMD time delay, and to minimize PMD time delay of the transformed optical signal.

Embodiments of this aspect may include one or more of the following features. The polarization module includes a polarimeter. The delay controller includes a polarimeter. The delay controller further includes a delay transformer arranged in the path of the optical signal before the polarimeter of the delay controller and after the polarization transformer. The polarization transformer includes a quarter-waveplate and a half-waveplate.

In another aspect the invention features a method of reducing PMD of an optical signal propagating in an optical medium. The method includes determining a first principal state of polarization of the optical medium with a polarization controller, and transforming the polarization of the optical signal with a polarization transforming device based on the polarization of the first principal state of polarization.

Embodiments of this aspect can include one or more of the following features. The method further includes determining the time delay between the first principal state of polarization and a second principal state of polarization. The method further includes delaying the first principal state of polarization with respect to a second principal state of polarization. The polarization controller includes a polarimeter. The first principal state of polarization is transformed into a linearly polarized state. The first principal state of polarization is transformed with a quarter-waveplate and a half-waveplate.

The invention has various advantages including, but not limited to, one or more of the following. The apparatus for compensating PMD operates in real time and does not require a fast detector.

DESCRIPTION OF THE EMBODIMENTS

Figure 1:
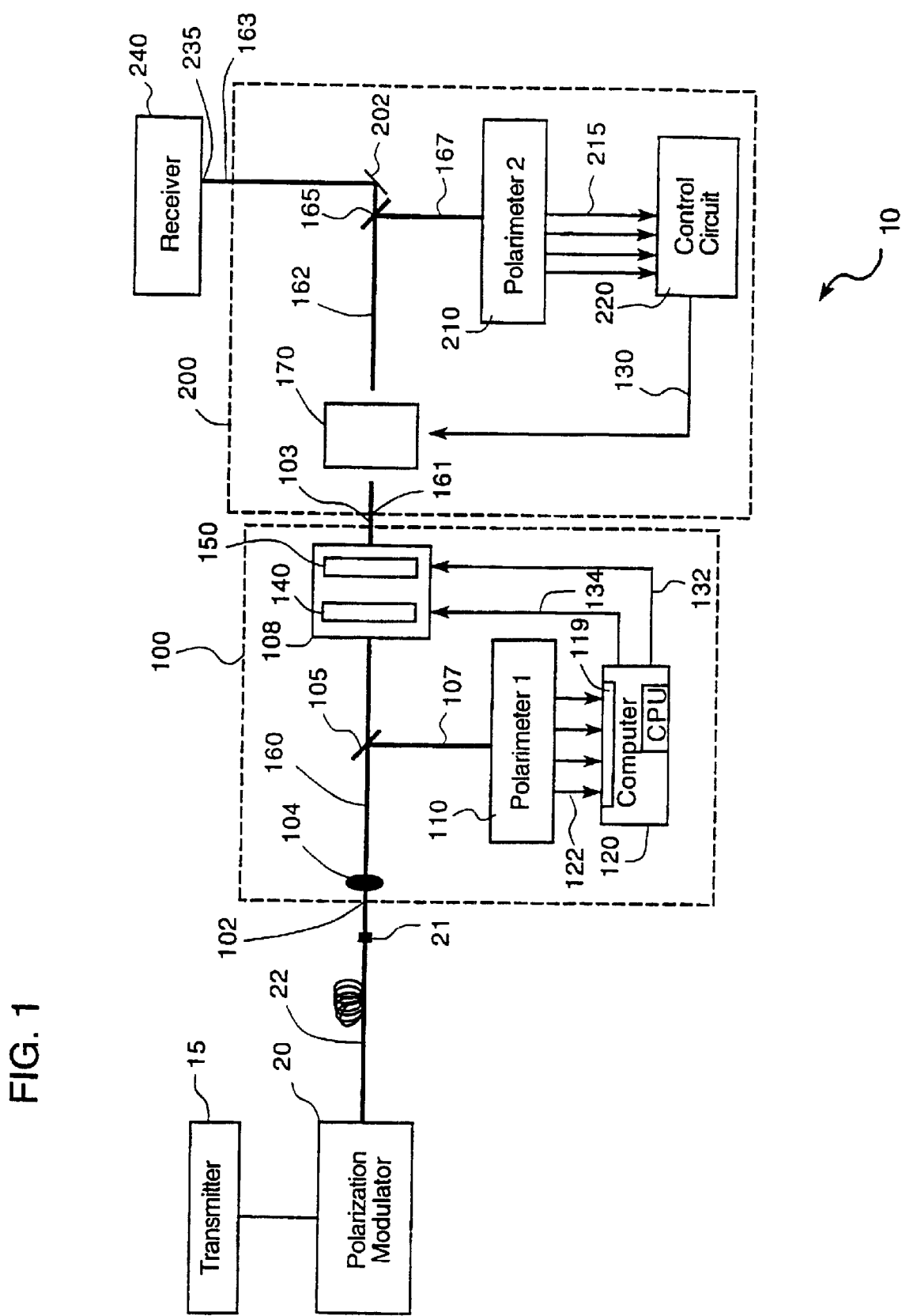
FIG. 1 is a block diagram of a PMD compensating apparatus.

Referring to FIG. 1, compensating apparatus 10 includes a polarization controller 100 and a delay controller 200. Compensating apparatus 10, when placed between an output 21 of an optical fiber 22 and an input 235 of optical receiver 240, reduces the PMD of optical signals transmitted by optical transmitter 15 though optical fiber 22.

Polarization controller 100 includes a lens 104, a beam splitter 105, a polarimeter 110, and a polarization transformer 108. Lens 104 positioned at an input 102 of polarization controller 100 collimates optical signals (not shown) from output 21 of optical fiber 22 along an optical path 160. Optical path 160 extends from input end 102, through beam splitter 105, polarization controller 108, and out output end 103. Beam splitter 105 redirects a portion of the optical signal propagating along beam path 160 into polarimeter 110 which detects the redirected optical signals and sends a series of electronic signals through cables 122 to an I/O port 119 of a computer 120. Computer 120 uses the electronic signals in an algorithm stored in the computer's CPU to determine the principal states of polarization (PSPs) of optical fiber 22 and sends control signals to modify the settings of a first retarder 140 and a second retarder 150 in polarization transformer 108. First retarder 140, e.g., a quarter-waveplate, and second retarder 150, e.g., a half-waveplate, transform the polarization of the PSP such that light exiting polarization controller 100 is linearly polarized and aligned to the x- and y-axis of delay controller 200.

Delay controller 200 includes a delay module 170, a beam splitter 165, a polarimeter 210, a controller 220, and a mirror 202. An optical beam path 162 extends between an input 161, through delay module 170, and beam splitter 165. Mirror 202 reflects optical signals out of delay controller 200 through output 163 and into input 235 of receiver 240. Beam path 162 at input 161 is collinear with beam path 160 from polarization controller 100 such that collimated optical signals exiting output end 103 propagate along beam path 162.

After the optical signals pass through delay module 170, beam splitter 165 redirects a portion of the optical signal propagating along beam path 162 into polarimeter 210. Polarimeter 210 detects the redirected optical signals and sends a series of electronic signals via cables 215 to a control circuit 220. Polarimeter 210 is similar in structure to polarimeter 110 described below. Control circuit 220 uses the electronic signals sent from polarimeter 210 to determine the time delay between the PSPs in optical fiber 22 and then sends a control signal via cable 130 to delay controller 170. The control signal modifies the settings of delay controller 170 such that the time delay is reduced between the two PSPs transmitted through outlet 21 of optical fiber 22.

Figure 2:
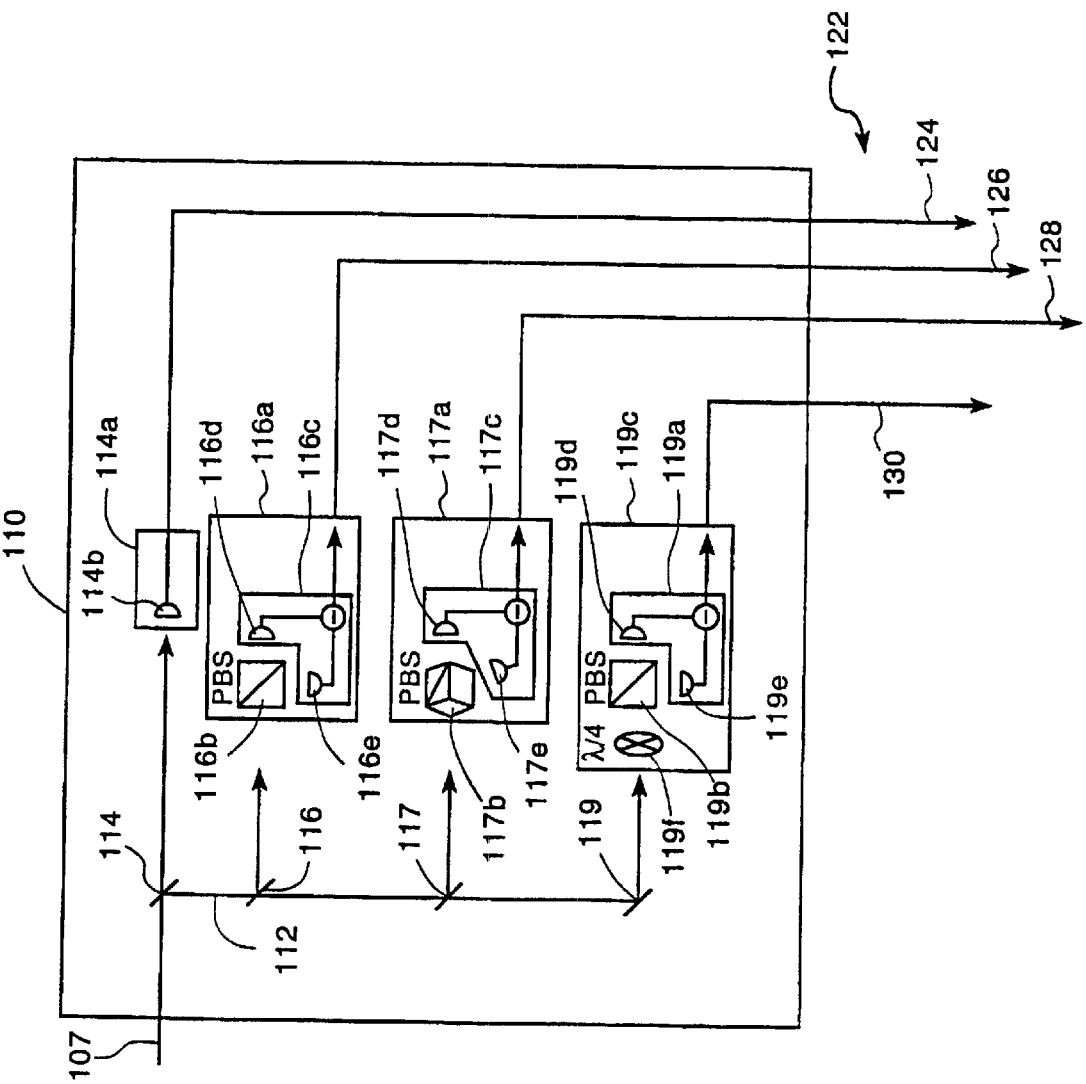
FIG. 2 is a block diagram of a polarimeter shown in FIG. 1.

Referring to FIG. 2, polarimeter 110 includes three beam splitters 114, 116, 117, and a mirror 119 spaced along an optical beam path 112. Beam splitters 114, 116, 117, and mirror 119 couple optical signals propagating along beam path 112 towards detector modules 114a, 116a, 117a, 119a, respectively. Detector module 114a includes a detector 114b for measuring the total power of an optical signal. Detector module 116a includes a polarizing beam splitter 116b and a detector assembly 116c having a first detector 116d and a second detector 116e. Similarly, detector module 117a includes a polarizing beam splitter 117b and a detector assembly 117c. Detector module 119a includes a polarizer 119f, e.g., a quarter-waveplate, a polarizing beam splitter 119b, and a detector assembly 119c. Each detector module measures specific optical properties of the optical signal and sends an electronic signal proportional to each measured property to computer 120 via cables 122.

Figure 3:
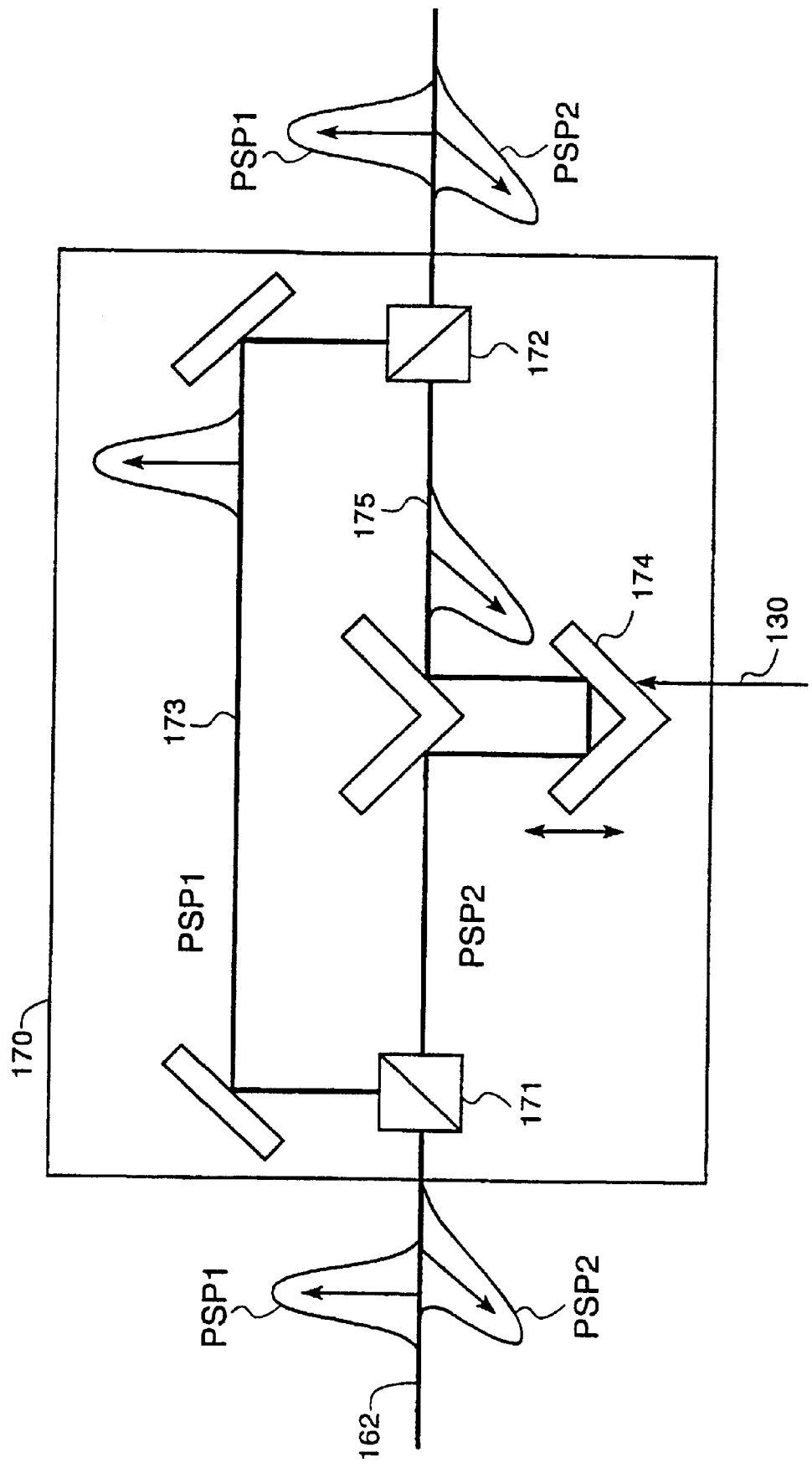
FIG. 3 is a block diagram of a delay module shown in FIG. 1.

Referring to FIG. 3, delay module 170 includes an input polarizing beam splitter 171, an optical delay assembly 174, and an output polarizer 172. Polarizing beam splitter 171 separates the two PSPs transmitted through optical fiber 22 and polarization controller 100 such that PSP1, delayed with respect to PSP2, propagates along a fixed optical path 173 to polarizing beam splitter 172, and PSP2 propagates along a variable optical path 175. Variable optical path 175 includes optical delay assembly 174, e.g., a translatable (Arrows) mirror, which delays PSP2 with respect to PSP1. PSP1 and PSP2 recombine in polarizing beam splitter 172 and continue propagating along beam path 162.

Figure 4:
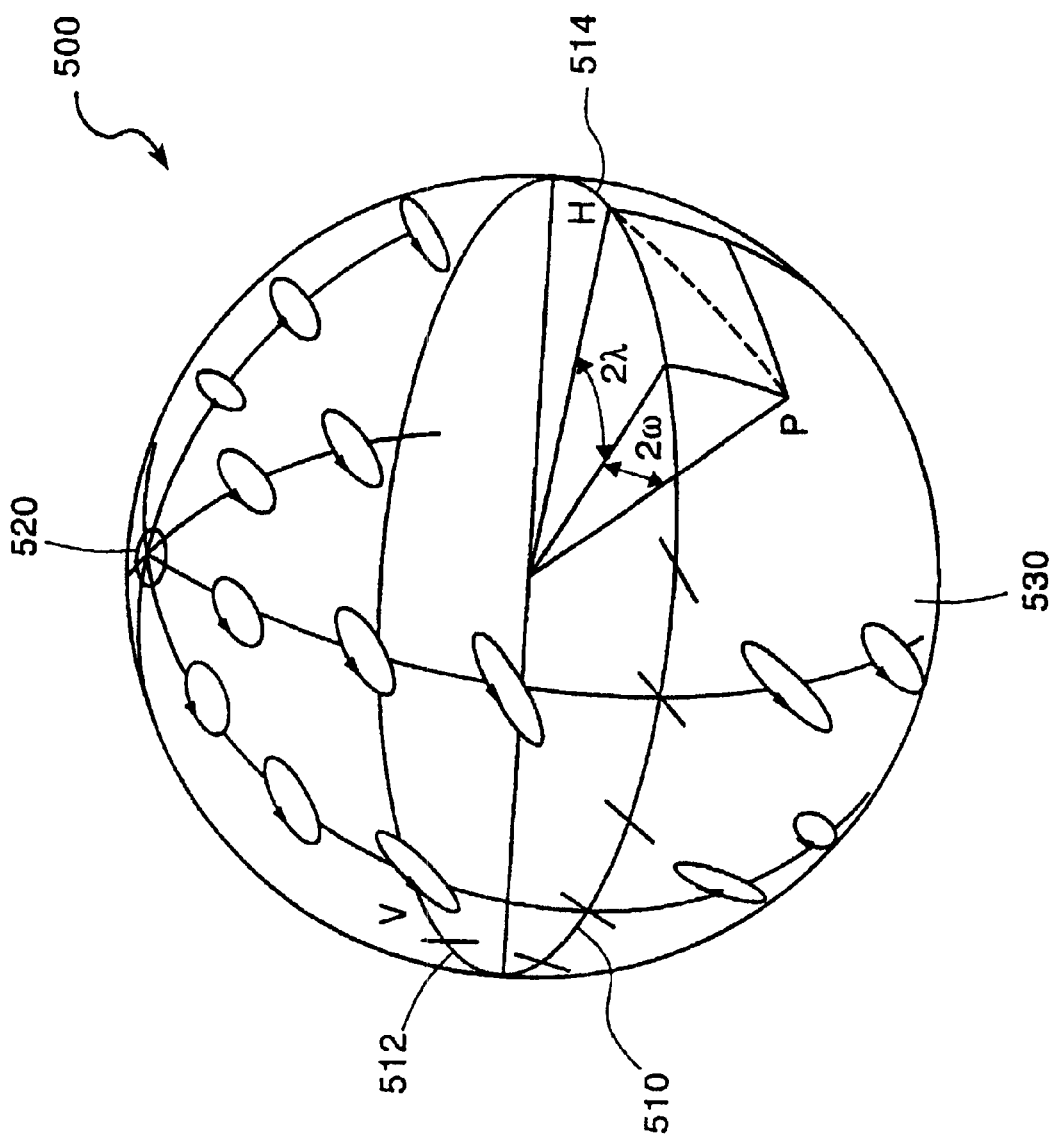
FIG. 4 is a schematic representation of a Poincaré sphere.

Referring to FIG. 4, a convenient and intuitive graphical representation of SOPs is a Poincaré sphere 500. A SOP is defined in terms of a Stokes vector of Formula 1:

$$<S_0 S_1 S_2 S_3> \qquad (1)$$

where $$S_0 = E^2_x + E^2_y \qquad (2)$$

$$S_1 = E^2_x - E^2_y \qquad (3)$$

$$S_2 = 2E_x E_y \cos(\emptyset) \qquad (4)$$

$$S_3 = 2E_x E_y \sin(\emptyset) \qquad (5)$$

and $E_x$ and $E_y$ are the magnitudes of the x and y component electric field complex amplitudes, respectively. $\emptyset$ is the relative phase between the two. The parameters $s_1$, $s_2$ and $s_3$ are represented by the relationship $s_i = (S_i)/(S_0)$, where i is 1, 2, or 3, and can be used to convert the Stokes parameters to corresponding x, y, and z components in a three dimensional Cartesian coordinate system. In a three dimensional Cartesian coordinate system, Poincaré sphere 500 is defined by a set of points containing all possible SOPs. As seen in FIG. 4, all linear polarization states are located on an equator 510 of sphere 500, while left and right circular polarizations are located at a north pole 520 and a south pole 530, respectively. All other points represent elliptical polarizations which lie away from equator 510 and poles 520, 530. Each SOP on sphere 500 is identifiable by its latitude 2w and longitude 2λ by using equations:

$$s_1 = \cos(2w)\cos(2\lambda) \quad (7)$$

$$s_2 = \cos(2w)\sin(2\lambda) \quad (8)$$

$$s_3 = \sin(2w) \quad (9)$$

where any two orthogonal SOPs lie directly opposite each other, e.g., a linear vertical polarization 512 is 180 degrees away from a linear horizontal polarization 514 on equator 510.

In operation, transmitter 15 sends a polarized optical signal to polarization modulator which modulates the state of polarization ("SOP") of the optical signal, e.g., from vertical to right circular to elliptical, with a frequency of about 10 kHz to about 100 MHz. The modulating frequency is fast enough to measure and compensate varying PMD on a millisecond timescale. The modulating frequency is limited by the response time of the detectors used in the polarimeters.

Figure 5A:
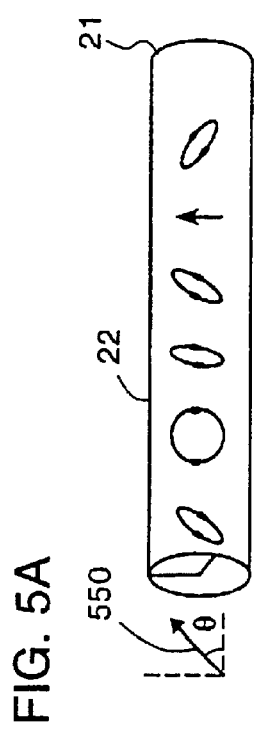
FIG. 5A is a schematic representation of an optical signal propagating through an optical fiber of FIG. 1.
Figure 5B:
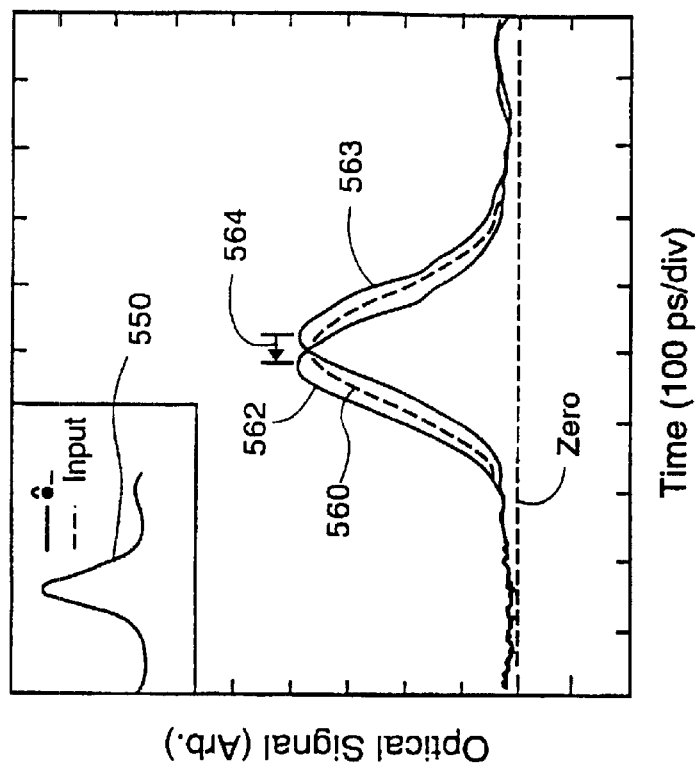
FIG. 5B is a graphical representation of the optical signal propagating through an optical fiber of FIG. 1.

Referring to FIG. 5A, as an input SOP 550 propagates from polarization modulator (not shown) through optical fiber 22 towards output 21, the SOP of the signal randomly changes. Each SOP propagates through the optical fiber at a different speed, e.g., some SOPs travel faster and some travel slower, resulting in a varying pulse width distortion of an optical signal 560 at output 21. To a first order approximation, optical fiber 22 has two discrete group delays, one for each of two orthogonal PSPs, i.e., PSP 562 and PSP 564. Referring to FIG. 5B, optical signal 560, a SOP, is a linear combination of PSP 562 and PSP 564. A time delay 565, e.g., 40 ps, between PSP 562 and PSP 564 creates PMD in the output signal, i.e., the width of signal 560 is greater than signal 550.

At outlet 21, optical signal 560 propagates into compensating apparatus 10 which reduces the PMD in signal 560 with polarization controller 100 and delay controller 200. Polarization controller determines the PSPs of the optical fiber 22 and transforms the two PSPs to x and y linearly polarized states aligned with the x and y optical axis of delay module 170. Delay controller 200 measures the time difference between the two transformed PSPs and delays one PSP relative to the other.

After exiting optical fiber 22, optical signal 560 travels through polarization controller 100 along beam path 160, until beam splitter 105 redirects a portion, e.g., about 1%, of the optical signal into polarimeter 110 for analysis. The amount of optical signal redirected into polarimeter is sufficient such that the redirected optical signal is measurable by each of the detectors in polarimeter 110.

Referring back to FIG. 2, beam splitters 114, 116, 117 evenly divide the optical signal entering polarimeter 110 into four separate optical signals. Detector module 114a measures the power of the first optical signal, i.e., $S_0$. Detector module 116a analyses the second signal by measuring the difference between optical signals having polarization components oriented in the x and y direction, i.e., $S_1 = E_x^2 - E_y^2$. Optical signals having only x oriented polarization components result in a measurement of +1 by detector module 116a, and optical signals having only y oriented polarization components result in a measurement of −1. Detector module 117a analyzes the third signal by measuring the difference between optical signals having polarization components oriented 45 degrees with respect to the x and y direction, i.e., $S_2 = E^2_{+45} = 2E_xE_y\cos(\emptyset)$ (where $\emptyset$ is the phase between $E_x$ and $E_y$). Detector module 119a analyzes the fourth signal by measuring the difference between optical signals having left and right circular polarization components, i.e., $S_3 = 2E_xE_y\sin(\emptyset)$ where $\emptyset$ is the phase between $E_x$ and $E_y$. Optical signals having only right circular polarization results in a measurements of +1, and left circular polarization results in a measurement of −1. Polarimeter 110 measures each of the Stokes parameters, Equations 2–5, and sends electronic signals proportional to each measurement to computer 120.

Figure 6:
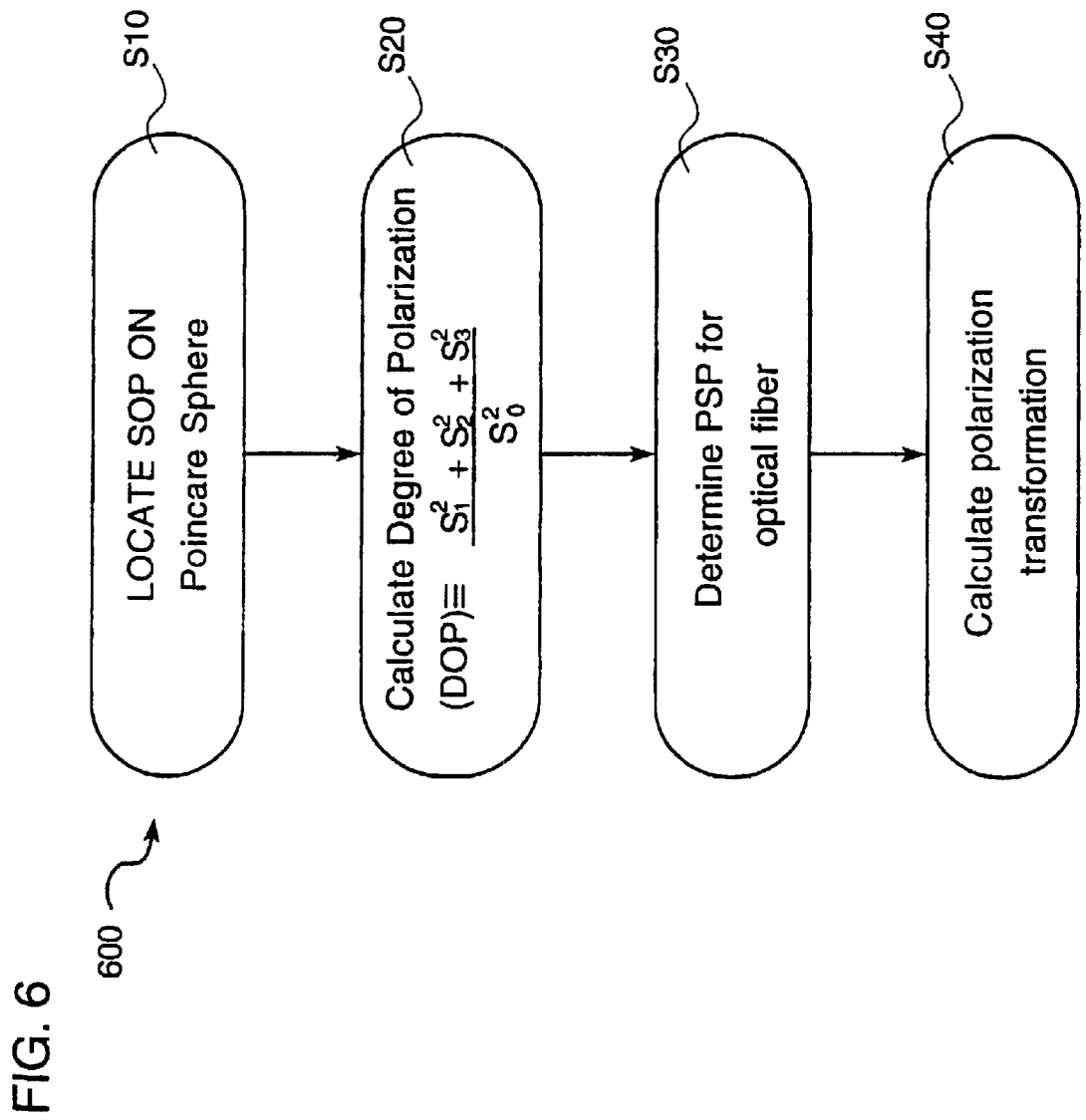
FIG. 6 is a schematic flow chart of the PSP algorithm.

Referring to FIG. 6, computer 120 receives the electrical signals from polarimeter 110 and runs an algorithm 600 stored in the computer's CPU to determine the location of the SOP on a Poincaré sphere (S10), to calculate a degree of polarization (DOP) for each SOP (S20), to determine the two orthogonal PSPs for the optical fiber (S30), and to calculate a polarization transformation which converts the PSPs of the fiber to linear x and y polarization states aligned with the x and y optical axis of delay module 170 (S40).

The CPU determines the location of the SOP on the Poincaré sphere by relating each of the electrical signals from the polarimeter to its corresponding Stokes parameter, equations 7–9, and then calculating w and λ, i.e., the coordinates of the SOP on the Poincaré sphere. Each of the Stokes parameters is also used by the CPU to calculate degree of polarization (DOP). The ratio of Stokes parameters shown below $$DOP^2 = \frac{S_1^2 + S_2^2 + S_3^2}{S_0^2} \quad (13)$$

is less than or equal to unity.

Figure 7A:
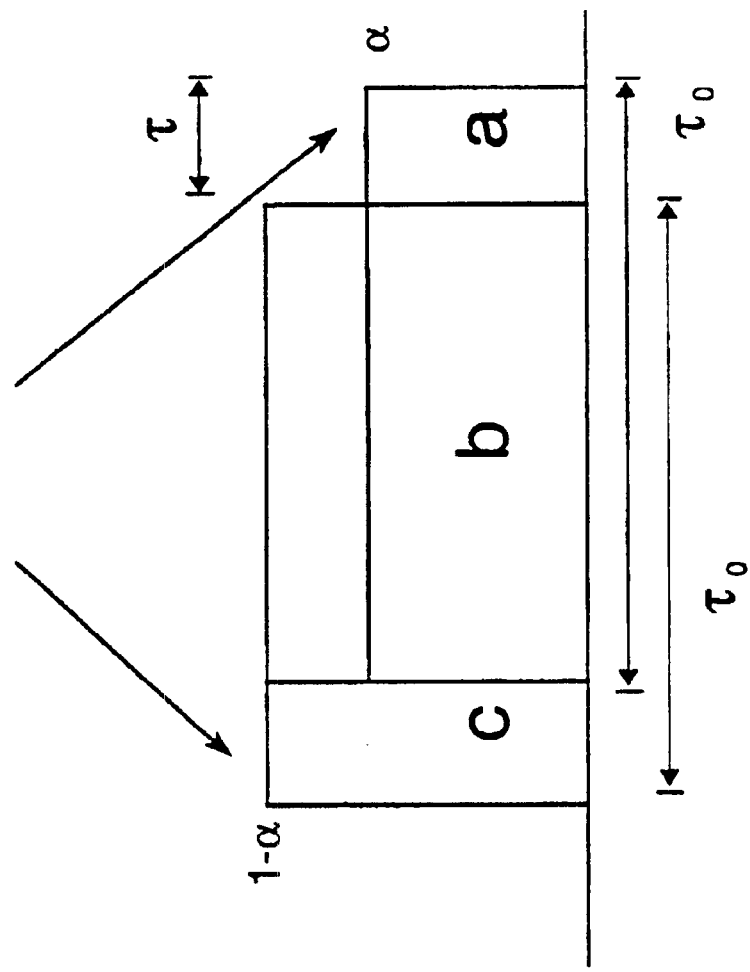
FIG. 7A is a schematic representation of the principal states of polarization of an optical signal propagating through an optical fiber of FIG. 1.

Referring to FIG. 7A, two PSPs, i.e., square shaped pulses of length $\tau_0$, have a first order PMD delay of τ and a relative power with respect to each other described by the parameter α. To a first order approximation, i.e., when $\tau/\tau_0$ is less than 1, the DOP of the two square PSPs, equation 13, can be rewritten as a function of delay, λ, and relative power, α:

$$DOP(\tau,\alpha) = [1 + 4\alpha(\tau/\tau_0)((\tau/\tau_0) - 2)(1-\alpha)]^{1/2}. \quad (14)$$

Figure 7B:
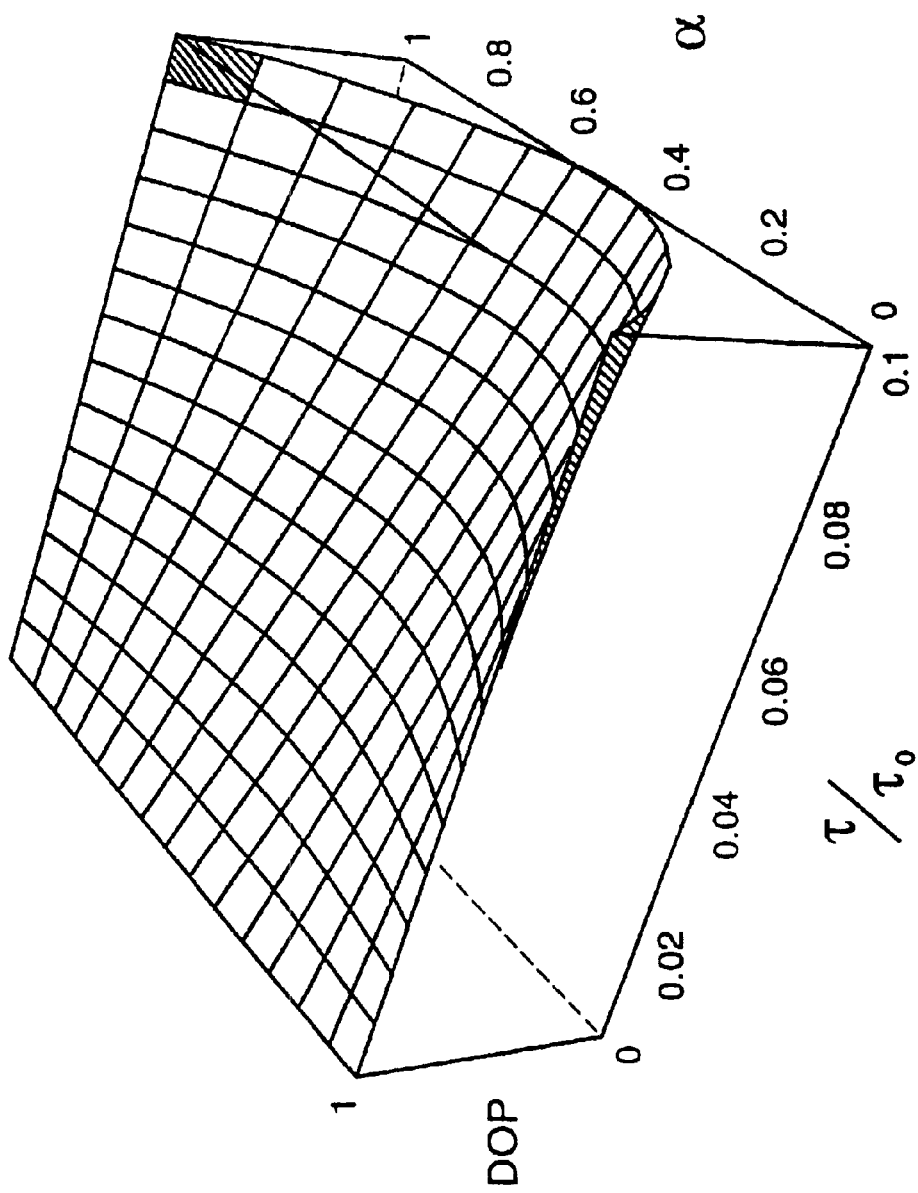
FIG. 7B is a graphical representation of the degree of polarization as a function of the time delay, τ, between and the relative power, α, of each principal state of polarization.

A plot of Equation 14 (FIG. 7B) graphically shows how DOP depends on delay and relative power of the PSPs. At constant delay, τ, DOP is at a minimum when both PSPs have equal power, whereas DOP is at a maximum when only one PSP has all of the power, i.e., α is 1 or 0, respectively. At constant relative power, α, DOP is inversely related to the delay between the two PSPs. At a constant time delay between the two PSPs, the DOP depends on the SOP. When the SOP is a 50/50 mixture of both PSPs, i.e., each PSP has equal power, the DOP will be at a minimum, whereas the DOP will be unity when the SOP is aligned with one PSP, i.e., one PSP has all the power. As the value of $\tau/\tau_0$ approaches 1, the first order approximation of PMD fails and equation 14 is no longer valid.

Figure 8:
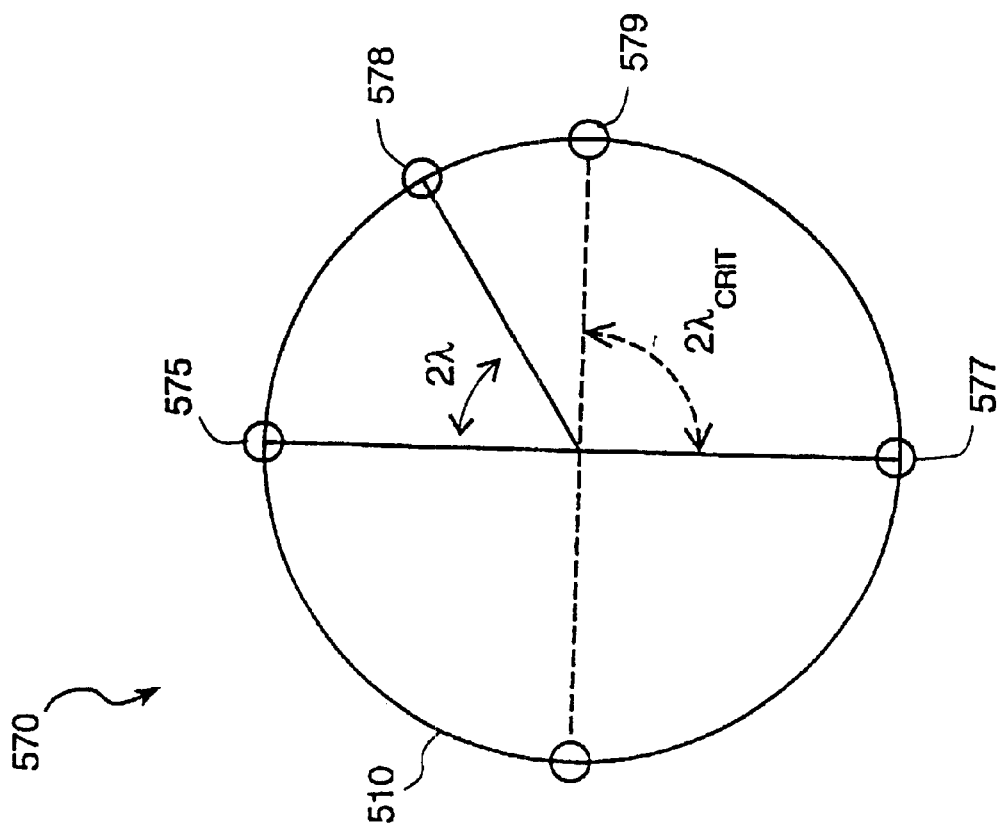
FIG. 8 is a cross-sectional view of the Poincaré sphere of FIG. 4 taken along the equator.

Referring to FIG. 8, the linear polarization states represented by circle 570 are synonymous with equator 510 of the Poincaré sphere 500 (see FIG. 4). Assuming that optical fiber 22 includes an x-horizontal linear PSP 575 and the y-vertical linear PSP 577, i.e., two, orthogonal PSPs, all other points on the circumference of circle 570 represent linear states at different orientations. A SOP 578 represents one possible linear SOP of an optical signal of optical fiber 22. SOP 578 contains components of both x and y polarizations, i.e., SOP 578 is a weighted linear combination of PSP 575 and PSP 577. Depending on the amount of time delay between PSP 575 and PSP 577, SOP 578 has a DOP that is less than or equal to unity. As the angular distance, 2λ, of SOP 578 to a PSP decreases, DOP increases. At the critical angular distance, $2\lambda_{crit}$, a SOP 579 is equally distant from PSP 575 and PSP 577, i.e., SOP 579 is a 50/50 mixture of PSP 575 and PSP 577, resulting in a minimum DOP. The definitions of the Stokes parameters, such as $S_1$, provide a relation between α and the radial distance 2λ such that Equation 14 takes the form.

$$DOP(\tau, 2\lambda) = \left[ \frac{1 + \frac{\tau}{\tau_0}\left(\frac{\tau}{\tau_0} - 2\right)}{1 + \frac{\tau}{\tau_0}\left(\frac{\tau}{\tau_0} - 2\right)\cos^2(2\lambda)} \right]^{\frac{1}{2}}. \quad (15)$$

In general, the DOP is a function of 2λ', the angular distance between the SOP and any PSP on the Poincaré sphere. 2λ' is a function of the longitude distance, 2λ, and the latitude distance, 2w. Using the definitions of the Stokes parameters, Equation 14 is rewritten in the form.

$$DOP(\tau, 2\lambda') = \left[ \frac{1 + \frac{\tau}{\tau_0}\left(\frac{\tau}{\tau_0} - 2\right)}{1 + \frac{\tau}{\tau_0}\left(\frac{\tau}{\tau_0} - 2\right)\cos^2(2\lambda')} \right]^{\frac{1}{2}} \quad (16)$$

If the PSPs of an optical fiber are unknown, computer 120 runs algorithm 600 while polarization modulator 20 changes the SOP. For each SOP, algorithm 600 calculates both the location of the SOP on the Poincaré sphere and the DOP. The algorithm sends these values into memory and repeats the cycle. Algorithm 600 stops collecting data points and fits, e.g., by linear-least-squares, the data in memory to find the maximum DOP, i.e., a DOP of unity corresponds to a SOP which represents one of the PSPs. Algorithm 600 collects enough data points so that the DOP as a function of SOP is well represented. Collecting too few data points leads to incorrect fitting results, whereas collecting too many data points is time consuming and allows environmental changes, i.e., temperature and stress on the fiber, to affect the location of the PSPs on the Poincaré sphere. Once the CPU calculates the identity of the PSPs, algorithm 600 calculates a polarization transformation necessary to transform the PSPs into linearly polarized x-horizontal and y-vertical PSPs aligned to the x-horizontal and y-vertical axis of delay module 170.

Algorithm 600 uses Stokes parameters and Jones matrices representing the PSP polarization states, retarder 140, and retarder 150 to calculate the settings of the retarders which transform the PSPs into linear horizontal and vertical states. Algorithm 600 begins with an arbitrary polarization state A $$A = \begin{bmatrix} \delta \\ \varepsilon e^{i\varphi} \end{bmatrix} \quad (17)$$

where $\delta^2 + \epsilon^2 = 1$, and a horizontal polarization state, i.e., a x-horizontal state, is represented by the Jones matrix, $$x\text{-horizontal} = \begin{bmatrix} 1 \\ 0 \end{bmatrix} \quad (18)$$

The angle, A, between a major axis of the arbitrary state and the axis of a Cartesian coordinate system is $$A = 2 \tan^{-1}[(2\delta\epsilon \cos(\varphi))/\delta^2 - \epsilon^2)]. \quad (19)$$

Algorithm 600 converts the known PSPs from Cartesian coordinates into Jones matrices, and determines A.

Once A is known, Algorithm 600 calculates how to orient retarder 140 to convert the PSPs into linearly polarized states having an angle, A, between the x-axis of the Cartesian coordinate system and the axis of the linearly polarized states. Next, Algorithm 600 calculates how to orient retarder 150 to rotate, i.e., by β, the linearly polarized states so that they coincide with x-horizontal and y-vertical polarization states.

A complete transformation of an arbitrary state into a linearly x-horizontal polarization state using a quarter-waveplate as retarder 140 and a half-waveplate as retarder 150 is

[R(-β/2)×HW×R(β/2)]×[R(-A)×QW×R(A)]

where $$R(D) = \begin{bmatrix} \cos(D) & \sin(D) \\ -\sin(D) & \cos(D) \end{bmatrix},$$

$$HW = \begin{bmatrix} i & 0 \\ 0 & -i \end{bmatrix}, \text{ and}$$

$$QW = \begin{bmatrix} e^{i\frac{\pi}{4}} & 0 \\ 0 & e^{-i\frac{\pi}{4}} \end{bmatrix}.$$

The computer sends electrical control signals, based on the transformation calculations, both to retarder 140 to transform the PSPs to linear PSPs and to retarder 150 to rotate the linear PSPs to the x-horizontal and y-horizontal axis of the delay module.

The transformed optical signal propagates into delay module 170. Referring back to FIG. 3, polarizing beam splitter 171 redirects x-horizontally polarized optical signal, i.e., PSP 2, through a variable delay line and y-vertically polarized optical signal, i.e., PSP 1, through a fixed delay line. Polarizing beam splitter 172 recombines the x-horizontally and y-vertically polarized optical signals. Before the recombined signal exits delay controller 200, beam splitter 165 redirects a portion of the optical signal into polarimeter 210. Polarimeter 210 is similar to polarimeter 110 described above and sends electrical signal proportional to the stokes parameters to control circuit 220.

The control circuit, e.g., a microprocessor, calculates the DOP of the recombined signal. As shown in Equation 14, DOP is a function of both the time delay, τ, and the SOP of the optical signal, i.e., the relative power, α, of each PSP. Control circuit 220 calculates DOP and determines a time average DOP as polarization modulator 20 modulates the SOP of the input optical signal and the relative power, α, of each PSP. Referring back to FIG. 7b, the time averaged DOP, i.e., as α changes between values of 0 and 1, is at maximum for zero delay between PSP1 and PSP2, whereas the time averaged DOP decreases as the delay between the PSPs increases. Control circuit 220 sends electrical signals to delay assembly 174 to adjust the time delay between PSP1 and PSP2 such that the time averaged DOP is maximized.

Control circuit 220 averages the DOP for a time period that is sufficient to characterize the DOP for several SOPs. The shortest DOP averaging time period is set by the rate at which polarization controller 100 aligns the PSPs to the x- and y-axis of the delay module. At longer time periods, collecting too many data points is time consuming and allows environmental changes, i.e., temperature and stress on the fiber, to affect the location of the PSPs on the Poincaré sphere.

In other embodiments, the polarization transformer can include polarization transforming devices, e.g., electrooptic, acoustooptic, or stress induce bifringence, which can transform the PSPs to linearly polarized PSPs aligned with the x- and y-axes of the delay controller.

It should be understood that the foregoing description is intended to illustrate and not limit the scope of the invention, which is defined by the following claims. Other aspects, advantages, and modifications are within the scope of the following claims.

What is claimed is:

1. An optical compensating apparatus for reducing PMD in an optical signal transmitted through an optical medium, the apparatus comprising:

a polarization controller configured to receive an optical signal propagating through the optical medium, determine the principal states of polarization of the optical medium, and transform the optical signal.based on the principal states of polarization; and a delay controller arranged in an optical path of the medium after the polarization controller and configured to receive the transformed optical signal, to generate a signal proportional to the PMD time delay, and to minimize PMD time delay of the transformed optical signal.

2. The apparatus of claim 1, wherein the polarization controller includes a polarimeter that is connected to receive the optical signal propagating through the optical medium.

3. The apparatus of claim 1, wherein the delay controller includes a polarimeter arranged in a feedback configuration.

4. The apparatus of claim 2, wherein the polarization controller includes a polarization transformer that is controlled by the polarimeter.

5. The apparatus of claim 3, wherein the delay controller includes a delay transformer arranged in the path of the transformed optical signal before the polarimeter.

6. The apparatus of claim 4, wherein the delay controller includes a delay transformer and a polarimeter after the delay transformer, wherein the polarimeter of the delay controller is arranged in a feedback configuration to control the delay transformer.

7. The apparatus of claim 4, wherein the polarization transformer includes a quarter-waveplate and a half-waveplate.

8. An optical compensating apparatus for reducing PMD in an optical signal transmitted through an optical medium, the apparatus comprising:

a polarization module configured to receive an optical signal propagating through the optical medium, determine the optical properties of the optical medium, and generate a signal for transforming the polarization of the optical signal;

a polarization transformer arranged to receive the optical signal and configured to transform the optical signal based on the signal from the polarization module; and a delay controller arranged in an optical path of the medium after the polarization transformer and configured to receive the transformed optical signal, to generate a signal proportional to the PMD time delay, and to minimize PMD time delay of the transformed optical signal.

9. The apparatus of claim 8, wherein the polarization module includes a polarimeter.

10. The apparatus of claim 8, wherein the delay controller includes a polarimeter.

11. The apparatus of claim 8, wherein the delay controller includes a polarimeter and a delay transformer arranged in the path of the transformed optical signal before the polarimeter of the delay controller.

12. The apparatus of claim 8, wherein the polarization transformer includes a quarter-waveplate and a half-waveplate.

* * * * *